United States Patent [19]

Short

[11] Patent Number: 5,135,257
[45] Date of Patent: Aug. 4, 1992

[54] ADJUSTABLE BREAKAWAY SEAT BELT SHOULDER HARNESS COMFORT STRAP

[76] Inventor: Thomas T. Short, P.O. Box 1870, Porterville, Calif. 93258

[21] Appl. No.: 569,295

[22] Filed: Aug. 20, 1990

[51] Int. Cl.⁵ .............................................. B60R 22/00
[52] U.S. Cl. ................................. 280/808; 297/482; 297/483; 280/801
[58] Field of Search ....................... 280/801, 802, 808; 297/482, 483, 486

[56] References Cited

U.S. PATENT DOCUMENTS

| | | | |
|---|---|---|---|
| 3,307,872 | 3/1967 | Murcott | 297/385 |
| 3,313,511 | 4/1967 | Koerner | 248/361 |
| 3,521,901 | 7/1970 | Wackym | 280/150 |
| 3,713,693 | 1/1973 | Cadiou | 297/389 |
| 3,947,927 | 4/1976 | Rosenthal | 24/81 SK |
| 4,013,306 | 3/1977 | Imabuchi et al. | 280/745 |
| 4,056,271 | 11/1977 | Imabuchi et al. | 280/745 |
| 4,268,067 | 5/1981 | Thomas | 280/802 |
| 4,506,912 | 3/1985 | Ahad | 280/808 |
| 4,609,205 | 9/1986 | McKeever | 280/808 |
| 4,648,625 | 3/1987 | Lynch | 280/808 |
| 4,786,080 | 11/1988 | Jay | 280/808 |
| 4,796,919 | 1/1989 | Linden | 280/808 |
| 4,799,737 | 1/1989 | Greene | 280/808 |
| 4,832,367 | 5/1989 | Usenby | 280/808 |
| 4,921,273 | 5/1990 | Weightman et al. | 280/808 |
| 4,946,198 | 8/1990 | Pittore et al. | 280/808 |
| 4,973,083 | 11/1990 | Richards et al. | 280/808 |

FOREIGN PATENT DOCUMENTS 3132735  8/1981  Fed. Rep. of Germany .

Primary Examiner—Kenneth R. Rice
Attorney, Agent, or Firm—Thorpe, North & Western

[57] ABSTRACT

An adjustable breakaway comfort strap for use in connection with a restraining system which includes a seat belt and shoulder harness combination. The device includes first and second elongated strap members, each strap member having a combination of fastening elements such as VELCRO attached thereto for allowing adjustable attachment of the first and second strap members to the shoulder harness and lap belt strap respectively of an automobile restraining system. The first and second elongated straps also include an attachment tab which allows interconnection of the two straps to form a single elongated strap. The attachment tab is sized so that the attachment strength rendered thereby can be countered by forces generated in the shoulder harness of the restraining system in such a manner that an emergency situation will cause the shoulder harness and/or lap belt to pull the first and second strap apart at the tab and allow the restraining system to function properly, as originally designed, without interference from the comfort strap.

8 Claims, 1 Drawing Sheet

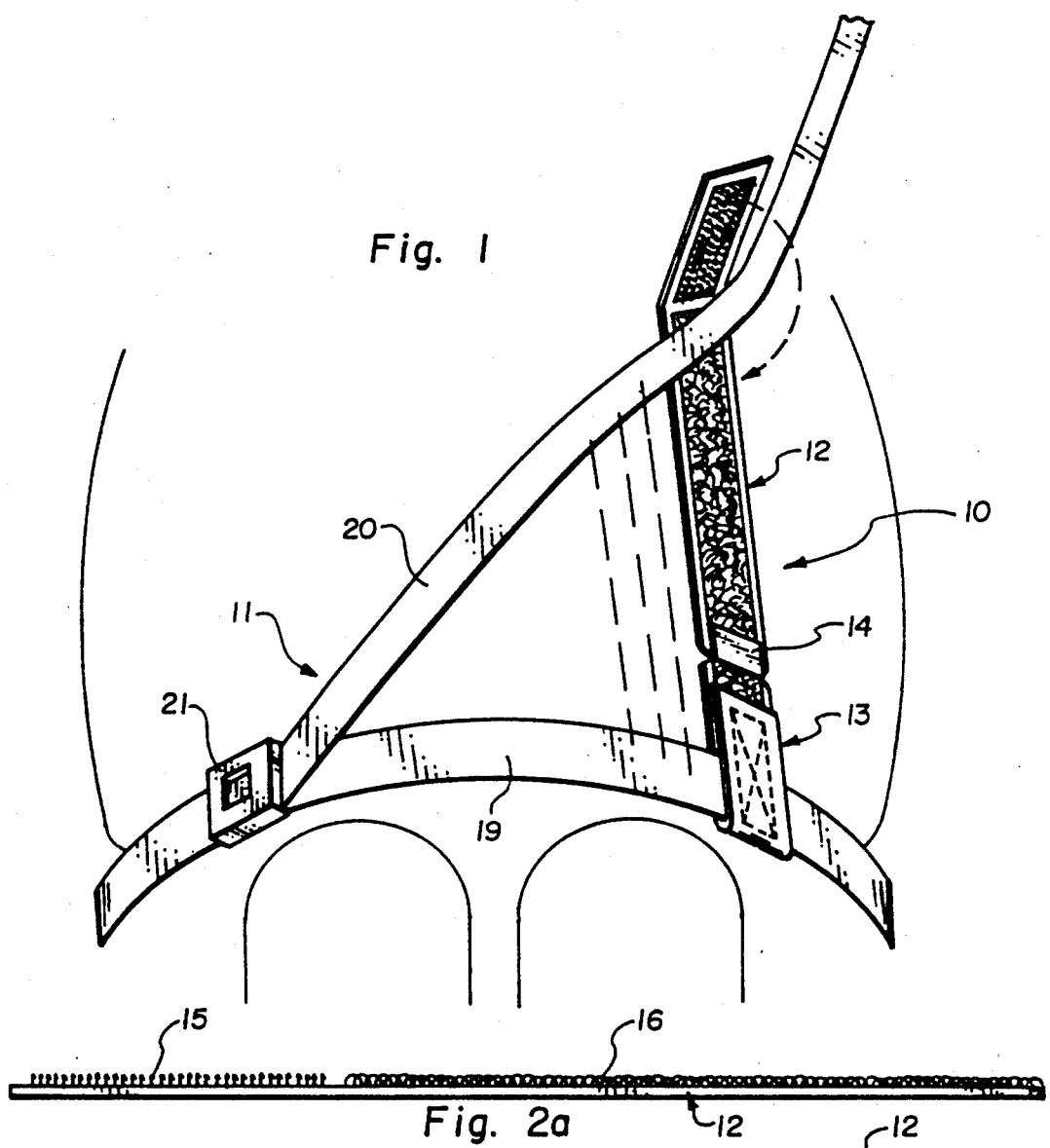
Fig. 1
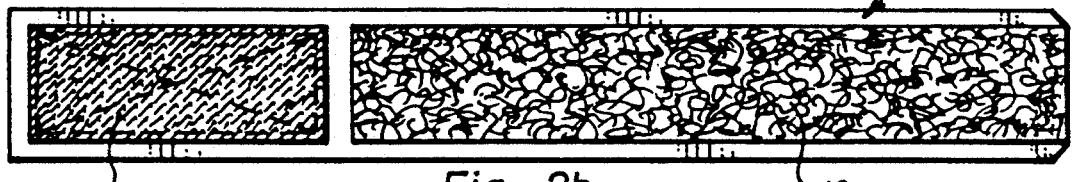
Fig. 2a
Fig. 2b
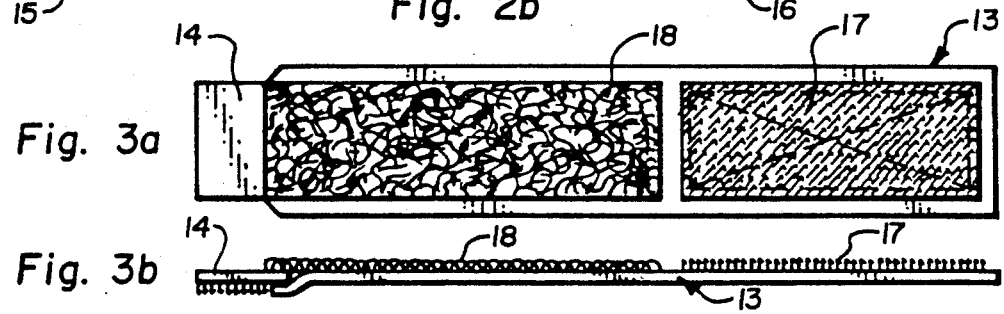
Fig. 3a
Fig. 3b

ADJUSTABLE BREAKAWAY SEAT BELT SHOULDER HARNESS COMFORT STRAP

BACKGROUND OF THE INVENTION

1. Field of the Invention

The present invention relates to safety belts and harnesses and more particularly to a strap which is adjustably attached to a safety lap belt and shoulder harness combination to increase the comfort thereof to the user. The present invention particularly relates to a comfort strap designed to hold a shoulder harness away from the user's neck and/or face during inactive restraint and then breakaway in an emergency situation to allow the shoulder harness to properly function without inhibition during active restraint in its predesigned manner.

2. Description of Prior Art

It has long been the goal of vehicle manufactures such as those in the automobile industry, to increase the comfort of their products. Especially, increasing the comfort of automobile operators and passengers while seated inside the vehicle has been a major emphasis and focus of industry. Also in recent years, it has been the goal of government to increase the safety of automobile passengers and operators. In fact, the Federal government has required the manufactures of many motor vehicles to include seat belts and shoulder harnesses in the manufacture of the vehicle. Further, many states have made it illegal to operate a motor vehicle unless the operator and often the passengers also, are properly restrained by the seat belts and/or shoulder type restraining system harnesses provided in the vehicle by the manufacturer. This major concern has resulted in a requirement that all automobiles include seat belts (and also shoulder harnesses in most cases) which are designed as a restraining system to properly restrain a passenger or operator during an emergency.

There is a definite conflict between the governments requirement to provide seat belts in motor vehicles, and private industries attempts to improve the operators of passengers comfort when riding in the vehicle. Many attempts have been made to modify restraining systems such as seat belts and/or shoulder harnesses, in order to improve the comfort thereof. However, in many instances these modifications tend to prevent the seat belt and/or shoulder harness restraining system from functioning as per its original design during an emergency. Therefore, many of these modifications are not looked upon favorably for use because of their safety concerns.

In many instances, the most uncomfortable aspect of seat belts and shoulder harnesses restraining system is the angle at which the shoulder harness passes over the operator or passengers body. In many cases, due to this angle (or due to the size of the operator or passenger) the shoulder harness tends to rub against the user's neck or face. Since the vehicle tends to be shifted, bounced, or otherwise constantly moved during operation momentum of the passenger or operator's body responding to movements of the vehicle cause constant rubbing of the shoulder harness against the user's neck or face. This can become extremely uncomfortable. Very often, the irritation of the shoulder harness overcomes the user's sense of safety and results in the user either removing the device entirely, or modifying the way it is attached. In either case, the effectiveness of the seat belt and shoulder harness restraining system is significantly diminished, if not eliminated by said action.

There therefore exists a need to develop a device for modifying a seat belt and shoulder harness restraining system in order to increase the comfort thereof during use, while at the same time allowing the system to operate properly, as originally designed, during any emergency situation.

OBJECTS AND SUMMARY OF THE INVENTION

It is an object of the present invention to provide a device which improves the comfort of a seat belt/shoulder harness restraining system and which will also allow the system to properly function in an emergency situation.

It is another object of the present invention to provide a device which is attachable to a shoulder harness so as to move the shoulder harness away from the user's neck or face when in use, and which is automatically releasable in an emergency situation to allow proper orientation and operation of the shoulder harness.

It is further an object of the present invention to provide a device as described above which is simple to attach, easily adjustable and inexpensive.

These and other objects of the present invention are described in an Adjustable, Breakaway Seat Belt/Shoulder Harness Comfort Strap which is particularly designed to improve comfort to an operator or passenger of a vehicle in which a standard seat belt/shoulder harness restraining system has been installed. The invention includes a pair of strap members, preferably formed of the same type of material as the seat belt/shoulder harness itself, each straps including thereon at, one end thereof, a fastening element, such as the hook portion of a hook and loop type fastening device such as VELCRO, with the opposite ends of each strap including another fastening element such as the loop portion of a hook and loop fastening device, or fastening elements being located in adjacent relationship on one side of each strap, and combined, extending along the entire length of each strap. One end of one of the straps also includes an attachment tab which extends beyond one end of the strap, the attachment tab including hooks which may be used in conjunction with the loops of a fastening element of the opposite strap in order to allow both straps to be secured together. In use, one strap is looped around the shoulder harness and the hook and loop fastening elements are secured together to hold the strap in place thereon. The second strap is similarly attached to the lap seat belt. The attachment tab, located on one of the straps, is then attached to the fastening element of the other strap in order to secure the two straps together as a single assembly.

Once in place, the device may be moved laterally along the length of the seat belt and shoulder harness, which movement has the effect of pulling the shoulder harness down across the torso of the user and away from the user's neck or face. Similarly, if desired, the user may merely adjust the interengagement of the hook and loop fastening elements in order to effectively lengthen or shorten the device to adjust it to the comfort and size of the user.

The device has sufficient strength to hold the shoulder harness down away from the user's neck or face under normal (inactive) conditions. However, should an emergency occur, the tab with its hooks will shear away from the loops of the fastening element of the opposite strap. When this occurs, the device of the present invention no longer inhibits the proper (active) restraining function of the shoulder harness and seat belt.

The adjustability of the device allows it to be used by operators or passengers of different heights, weights, or other characteristics. Also the device of the present invention need not be permanently installed in any one vehicle, but may be removed and used in any vehicle having a lap belt and shoulder harness type restraining system.

The invention is made of an attractive material which maintains its shape and which may be washed and reused. It may be easily stored in a pocket, glove compartment, handbag or other small area.

The hook area associated with the attachment tab is chosen so as to have sufficient strength to hold the two straps in a unitary fashion during normal (inactive) use of the restraining system, yet is designed to immediately release against the force of the restraining system to allow it to move into its originally designed position for proper operation in any emergency situation.

BRIEF DESCRIPTION OF THE DRAWINGS

FIG. 1 is a perspective view of a comfort strap formed in accordance with the principles of the present invention showing the interengagement thereof with a seat belt/shoulder harness restraint system;

FIG. 2(a) is a side view of a first portion of the comfort strap formed in accordance with the principles of the present invention;

FIG. 2(b) is a front view of the first portion of the comfort strap as shown in FIG. 2(a);

FIG. 3(a) is a front view of a second portion of the comfort strap formed in accordance with the principles of the present invention, including the attachment tab secured to one end thereof; and FIG. 3(b) is a side view of the second portion of the comfort strap as shown in FIG. 3(a).

DETAILED DESCRIPTION OF THE INVENTION

Referring to the drawings wherein like reference characters designate like or corresponding parts throughout the several views and referring particularly to FIG. 1, there is shown an adjustable, breakaway shoulder harness comfort strap 10 being attached to a seat belt/shoulder harness restraint system 11. The device 10 includes a first strap 12 and a second strap 13 which are secured together by attachment tab 14 in a manner which will be explained below.

Straps 12 and 13 are preferably formed of the same type or similar material, and of the same width and thickness, as the straps of the restraining system 11, i.e. woven tye, elastic or nonelastic material. Referring to FIG. 2(a) and 2(b), strap 12 has included on the front surface thereof a fastening element 15 and a fastening element 16, the fastening elements preferably being secured to strap 12 by stitching as shown, but may also be secured in any other well known fashion such as gluing, riveting, etc. fastening elements 15 and 16 form the hook and pile elements of an attachment system commonly known as VELCRO. As shown in FIGS. 2(a) and 2(b), fastening element 15 includes hooks and fastening element 16 includes loops. It should be noted that the hooks and the loops may be reversed in their location on the strap 12 if desired.

As shown in FIG. 3(a) and 3(b), strap 13 also includes fastening element 17 and 18 which include hooks and loops respectively (or vice versa if desired). Strap 13 also includes an attachment tab 14 which is formed of a fastening element of hooks similar to that shown in element 17. Attachment tab 14 however is secured to the end of strap 13 such that the hooks extend therefrom in the direction opposite the direction of the hooks of fastening element 17.

It should be noted that the fastening elements 15, 16, 17, and 18, extend substantially along the entire length of the straps 12 and 13. In this manner, the straps may be adjusted to any desired length by adjusting the location of interengagement of fastening element 15 with fastening element 16 (and similarly with fastening element 17 and 18).

Referring again to FIG. 1, in use, the device 10 of the present invention is attached to a restraining system 11 by first engaging attachment tab 14 of strap 13 to the fastening element 16 of strap 12 in such a manner that the ends of straps 12 and 13 are securely held adjacent each other to form a single continuous strap. Fastening element 17 is then looped around seat belt portion 19 of the restraining system 11 and interengaged with fastening element 18. Fastening element 15 of strap 12 is then looped around shoulder harness 20 and (as shown by the arcuately shaped dashed arrows) engaged at the desired position along fastening element 16.

The attachment of device 10 in this manner causes the shoulder harness 20 of the restraining system 11 to be pulled away from the user's neck and/or face. Alternately, if desired, the entire device 10 once completely attached to the restraining system 11, may be slid along the length of the seat belt 19 and should harness 20 (see straight dashed lines) towards or away from the buckle 21 in order to comfortably position the harness strap 20 at a location away from the user's neck or face.

In operation, the device 10 functions to prevent the shoulder strap 20 from contacting the user's neck or face. However, in an emergency such as a crash, rapid stopping, or other high acceleration of the vehicle, should the shoulder harness 20 pull upward with a force sufficient to cause the hooks of tab 14 to be pulled away from the loops of fastening element 16, thus releasing shoulder harness 20 to move to its proper originally designed position for actively restraining the user during the emergency.

Since the release of attachment tab 14 immediately allows strap 12 and 13 to break apart in an emergency, the restraining system 11 functions in its proper manner as originally designed, with the device 10 having no effect whatsoever on the active, restraining function thereof.

Although the disclosure has only identified the fastening elements 15, 16, 17 and 18 and the attachment tab 14 to be formed of VELCRO, it is intended that any well known type fastening elements may be used in conjunction with the present invention so long as the adjustability of the fastening elements 15, 16, 17 and 18 is preserved, and the breakaway feature of the attachment tab 14 is also preserved. Examples of alternative acceptable fastening elements may be button and button hold combinations, socket and ball fastener combinations, wet or dry adhesive materials, etc.

It is to be understood that other variations and modifications of the present invention may be made without departing from the scope thereof, and that the present invention is not to be limited by the specific embodiment disclosed herein, but only in accordance with the appended claims when read in light of the foregoing specification.

I claim:

1. An adjustable, breakaway comfort strap for use in connection with a seat belt and shoulder harness restraint system comprising:

a first elongate strap member having a first fastening element and a second fastening element secure thereto, a second elongate strap member also having a first fastening element and a second fastening element attached thereto and further including an attachment element, whereby said first fastening element on said first strap member can cooperate with said second fastening element said first strap member to secure said first strap to the shoulder harness of said restraining system such that the position of said first strap member can be moved laterally along the shoulder harness, and said first fastening element of said second strap can cooperate with said second fastening element of said second strap to secure said second strap to the seat belt of a said restraining system such that the position of said second strap member can be moved laterally along the seat belt, and a third attachment element provided on said second strap member cooperates with said second fastening element of said first strap member to secure said first strap member to said second strap member, said comfort strap functioning to hold the shoulder harness away from a user's neck or face when the restraining system is in use, and said first and second elongated strap members are secured together, and said first strap member and said second strap member functioning to detach from each other under a predetermined force generated by an upward pull by said shoulder harness and/or a downward pull by the lap seat belt.

2. A comfort strap according to claim 1 wherein said first elongated strap member and second elongated strap member are formed of nonelastic material.

3. A comfort strap according to claim 1 wherein said first fastening elements and said second fastening elements of said first and second elongated strap members extend substantially the entire length of said elongate strap members.

4. The comfort strap according to claim 1 wherein said first and second fastening elements of said first and said second straps are comprised of button and button hole combinations.

5. The comfort strap according to claim 1 wherein said first and second fastening elements of said first and second strap members are comprised of socket and ball fastener combinations.

6. The comfort strap according to claim 1 wherein said first and second fastening elements of said first and second strap members are comprised of wet adhesive material.

7. The comfort strap according to claim 1 wherein said first and second fastening elements of said first and second strap members are comprised of dry adhesive material.

8. A comfort strap according to claim 1 wherein said first elongated strap member and said second elongated strap member are formed of elastic material.

* * * * *